US012567424B2

(12) United States Patent
Malenovsky

(10) Patent No.: US 12,567,424 B2
(45) Date of Patent: Mar. 3, 2026

(54) METHOD AND DEVICE FOR MULTI-CHANNEL COMFORT NOISE INJECTION IN A DECODED SOUND SIGNAL

(71) Applicant: VOICEAGE CORPORATION, Town of Mount Royal (CA)

(72) Inventor: Vladimir Malenovsky, Brno (CZ)

(73) Assignee: VOICEAGE CORPORATION, Town Of Mount Royal (CA)

( * ) Notice: Subject to any disclaimer, the term of this patent is extended or adjusted under 35 U.S.C. 154(b) by 238 days.

(21) Appl. No.: 18/553,783

(22) PCT Filed: Mar. 9, 2022

(86) PCT No.: PCT/CA2022/050342
§ 371 (c)(1),
(2) Date: Oct. 3, 2023

(87) PCT Pub. No.: WO2022/226627
PCT Pub. Date: Nov. 3, 2022

(65) Prior Publication Data
US 2024/0185865 A1 Jun. 6, 2024

Related U.S. Application Data

(60) Provisional application No. 63/181,621, filed on Apr. 29, 2021.

(51) Int. Cl.
*G10L 19/008* (2013.01)
*G10L 19/012* (2013.01)
(Continued)

(52) U.S. Cl.
CPC .......... *G10L 19/008* (2013.01); *G10L 19/012* (2013.01); *G10L 25/21* (2013.01); *H04S 7/30* (2013.01)

(58) Field of Classification Search
CPC ........ H04S 2420/03; H04S 7/30; H04S 1/007; H04S 2400/01; H04S 3/02; H04S 5/00;
(Continued)

(56) References Cited

U.S. PATENT DOCUMENTS 6,757,395 B1 * 6/2004 Fang .................. G10L 21/0208 704/226
8,767,974 B1 * 7/2014 Lu ......................... G10L 19/012 381/94.2
(Continued)

FOREIGN PATENT DOCUMENTS

CN 102063905 A * 5/2011
JP 2014-505907 3/2014
(Continued)

OTHER PUBLICATIONS

3GPP TS 26.445, v.16.1.0, "Codec for Enhanced Voice Services (EVS); Detailed Algorithmic Description", Jul. 2020, 24 sheets.
(Continued)

*Primary Examiner* — Leshui Zhang
(74) *Attorney, Agent, or Firm* — Fay Kaplun & Marcin, LLP

(57) ABSTRACT

A method and device are implemented in a multi-channel sound decoder for injecting multi-channel comfort noise in a decoded multi-channel sound signal. Background noise in a decoded mono down-mixed signal is estimated, and comfort noise for each of a plurality of channels of the decoded multi-channel sound signal is calculated in response to the estimated background noise. The calculated comfort noise is injected in the respective channels of the decoded multi-channel sound signal.

49 Claims, 5 Drawing Sheets

(51) Int. Cl.

| | |
|---|---|
| ***G10L 21/0216*** | (2013.01) |
| ***G10L 25/21*** | (2013.01) |
| ***G10L 25/84*** | (2013.01) |
| ***H04S 7/00*** | (2006.01) |

(58) Field of Classification Search

CPC .... H04S 1/00; H04S 3/00; H04R 3/04; H04R 27/00; H03M 3/466; G10L 19/012; G10L 19/008; G10L 25/21; G10L 19/24; G10L 25/84; G10L 19/03; G10L 21/0216; G10L 25/78; G10L 25/03; G10L 19/04; G10L 19/18; G10L 19/00; G10L 19/0017; G10L 19/002; G10L 19/087; G10L 19/22; G10L 21/0208; G10L 19/028; G10L 19/20; G10L 2025/786

USPC .................... 704/500–504; 381/1–23; 700/94

See application file for complete search history.

(56) References Cited

U.S. PATENT DOCUMENTS

| | | | | |
|---|---|---|---|---|
| 2015/0287415 | A1* | 10/2015 | Lombard | G10L 19/012 704/500 |
| 2015/0364144 | A1* | 12/2015 | Fuchs | G10L 19/012 704/500 |
| 2017/0047072 | A1* | 2/2017 | Eriksson | G10L 19/03 |
| 2021/0090582 | A1 | 3/2021 | Norvell et al. | |

FOREIGN PATENT DOCUMENTS

| | | | |
|---|---|---|---|
| JP | 2016-500453 | | 1/2016 |
| WO | 2014/143582 | A1 | 9/2014 |
| WO | 2015/122809 | A1 | 8/2015 |
| WO | 2019/193156 | | 10/2019 |
| WO | 2020/002448 | A1 | 1/2020 |
| WO | 2022008470 | | 1/2022 |

OTHER PUBLICATIONS

Schuijers et al., "Advances in parametric coding for high-quality audio," in Proc. 114th AES Convention, Amsterdam, The Netherlands, Preprint 5852, Mar. 2003, 12 sheets.

Baumgarte et al., "Binaural cue coding—Part I: Psychoacoustic fundamentals and design principles," IEEE Trans. Speech Audio Processing, vol. 11, Nov. 2003, pp. 509-519.

3GPP SA4 contribution S4-170749, "New WID on EVS Codec Extension for Immersive Voice and Audio Services", SA4 meeting #94, Jun. 26-30, 2017, 4 sheets http://www.3gpp.org/ftp/tsg_sa/WG4_CODEC/TSGS4_94/Docs/S4-170749.zip.

Hagen et al., "An 8 kbit/s ACELP coder with improved background noise performance," 1999 IEEE International Conference on Acoustics, Speech, and Signal Processing. Proceedings. ICASSP99 (Cat. No. 99CH36258), Phoenix, AZ, USA, vol. 1, 1999, pp. 25-28, doi: 10.1109/ICASSP.1999.758053.

Breebaart et al., "Parametric Coding of Stereo Audio", EURASIP Journal on Applied Signal Processing 2005, pp. 1305-1322. https://doi.org/10.1155/ASP.2005.1305.

* cited by examiner

METHOD AND DEVICE FOR MULTI-CHANNEL COMFORT NOISE INJECTION IN A DECODED SOUND SIGNAL

PRIORITY CLAIM

The present application is a National Phase Application of PCT Application Serial No. PCT/CA2022/050342 filed Mar. 9, 2022; which claims priority to U.S. Provisional Patent Application Ser. No. 63/181,621 filed Apr. 29, 2021. The disclosures of the above applications are incorporated herewith by reference.

TECHNICAL FIELD

The present disclosure relates to sound coding, in particular but not exclusively to a method and device for multi-channel comfort noise injection in a decoded sound signal at the decoder of a sound codec, in particular but not exclusively a stereo sound codec.

In the present disclosure and the appended claims:

The term "sound" may be related to speech, audio and any other sound;

The term "stereo" is an abbreviation for "stereophonic"; and

The term "mono" is an abbreviation for "monophonic".

BACKGROUND

Historically, conversational telephony has been implemented with handsets having only one transducer to output sound only to one of the user's ears. In the last decade, users have started to use their portable handset in conjunction with a headphone to receive the sound over their two ears mainly to listen to music but also, sometimes, to listen to speech. Nevertheless, when a portable handset is used to transmit and receive conversational speech, the content is still mono but presented to the user's two ears when a headphone is used.

With the newest 3GPP (3rd Generation Partnership Project) speech coding Standard, designated Enhanced Voice Services (EVS), as described in Reference [1], of which the full content is incorporated herein by reference, the quality of the coded sound, for example speech and/or audio that is transmitted and received through a portable handset has been significantly improved. The next natural step is to transmit stereo information such that the receiver gets as close as possible to a real-life audio scene that is captured at the other end of the communication link.

Efficient stereo coding techniques have been developed and used for low bitrates. As a non-limitative example, the so-called parametric stereo coding constitutes one efficient technique for low bitrate stereo coding.

Parametric stereo encodes two, left and right channels as a mono signal using a common mono codec plus a certain amount of stereo side information (corresponding to stereo parameters) which represents a stereo image. The two input, left and right channels are down-mixed into a mono signal, for example by summing the left and right channels and dividing the sum by 2. The stereo parameters are then computed usually in transform domain, for example in the Discrete Fourier Transform (DFT) domain, and are related to so-called binaural or inter-channel cues. The binaural cues (References [2] and [3], of which the full content is incorporated herein by reference) comprise Interaural Level Difference (ILD), Interaural Time Difference (ITD) and Interaural Correlation (IC). Depending on the signal characteristics, stereo scene configuration, etc., some or all binaural cues are coded and transmitted to the decoder. Information about what binaural cues are coded and transmitted is sent as signaling information, which is usually part of the stereo side information. Also, the binaural cues can be quantized (coded) using the same or different coding techniques which results in a variable number of bits being used. In addition to the quantized binaural cues, the stereo side information may contain, usually at medium and higher bitrates, a quantized residual signal that results from the down-mixing, for example obtained by calculating a difference between the left and right channels and dividing the difference by 2. The binaural cues, residual signal and signalling information may be coded using an entropy coding technique, e.g. an arithmetic encoder, Additional information about arithmetic encoders may be found, for example, in Reference [1]. In general, parametric stereo coding is most efficient at lower and medium bitrates.

Further, in last years, the generation, recording, representation, coding, transmission, and reproduction of audio is moving towards an enhanced, interactive and immersive experience for the listener. The immersive experience can be described, for example, as a state of being deeply engaged or involved in a sound scene while sounds are coming from all directions. In immersive audio (also called 3D (Three-Dimensional) audio), the sound image is reproduced in all three dimensions around the listener, taking into consideration a wide range of sound characteristics like timbre, directivity, reverberation, transparency and accuracy of (auditory) spaciousness. Immersive audio is produced for a particular sound playback or reproduction system such as a loudspeaker-based system, an integrated reproduction system (sound bar) or headphones. Then, interactivity of a sound reproduction system may include, for example, an ability to adjust sound levels, change positions of sounds, or select different languages for the reproduction.

In recent years, 3GPP (3rd Generation Partnership Project) started working on developing a 3D sound codec for immersive services called IVAS (Immersive Voice and Audio Services), based on the EVS codec (See Reference [4] of which the full content is incorporated herein by reference).

SUMMARY

The present disclosure relates to a method implemented in a multi-channel sound decoder for injecting multi-channel comfort noise in a decoded multi-channel sound signal, comprising: estimating background noise in a decoded mono down-mixed signal; and calculating, in response to the estimated background noise, comfort noise for each of a plurality of channels of the decoded multi-channel sound signal, and injecting the calculated comfort noise in the respective channels of the decoded multi-channel sound signal.

The present disclosure is also concerned with a device implemented in a multi-channel sound decoder for injecting comfort noise in a decoded multi-channel sound signal, comprising: an estimator of background noise in a decoded mono down-mixed signal; and an injector of comfort noise for calculating, in response to the estimated background noise, comfort noise for each of a plurality of channels of the decoded multi-channel sound signal and for injecting the calculated comfort noise in the respective channels of the decoded multi-channel sound signal.

The foregoing and other objects, advantages and features of the method and device for multi-channel comfort noise injection will become more apparent upon reading of the following non-restrictive description of illustrative embodiments thereof, given by way of example only with reference to the accompanying drawings.

DETAILED DESCRIPTION

Figure 1:
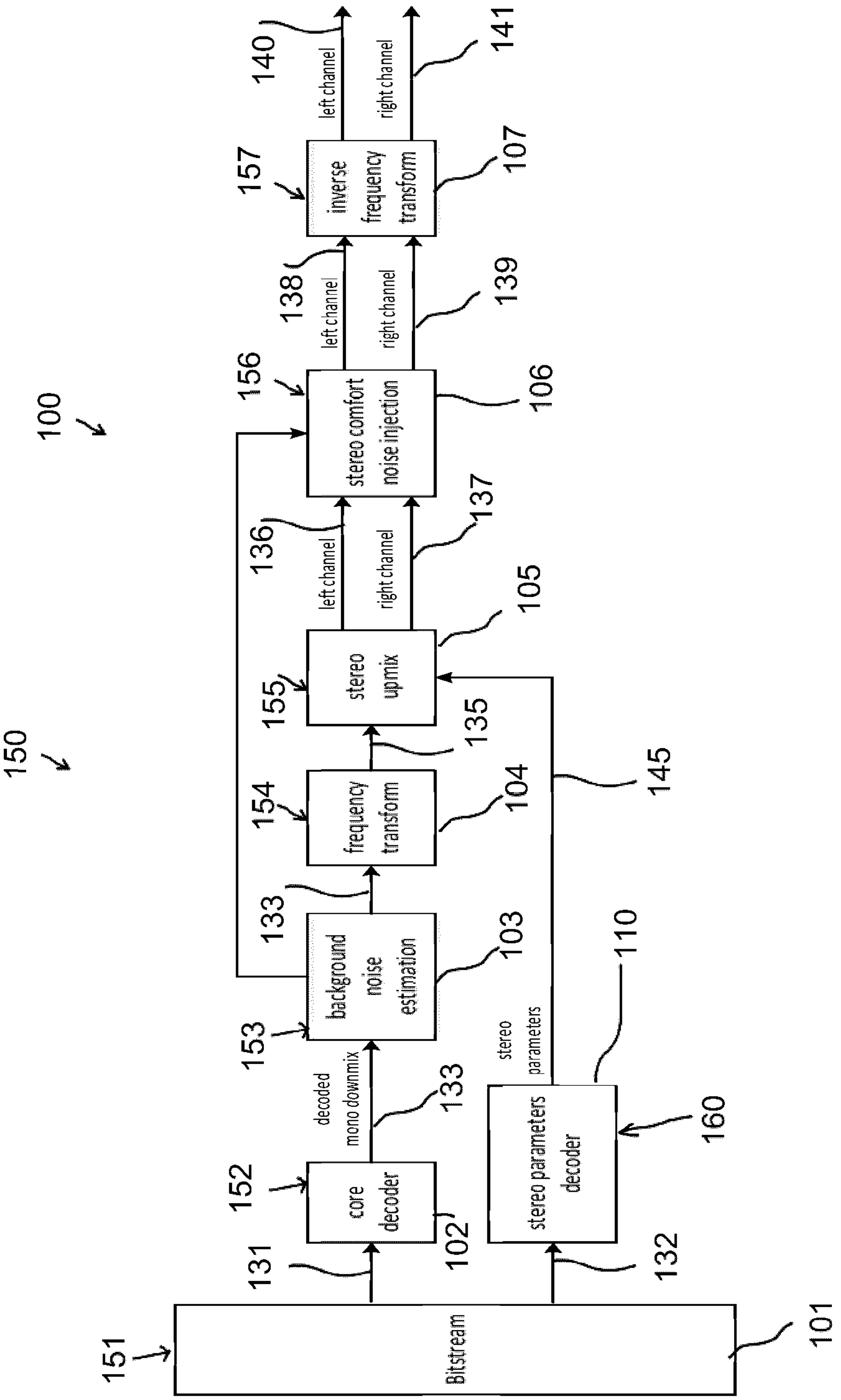
FIG. 1 is a schematic block diagram illustrating concurrently a parametric stereo decoder and a corresponding parametric stereo decoding method, including the device for multi-channel comfort noise injection and the method for multi-channel comfort noise injection.

The present disclosure generally relates to multi-channel, for example stereo comfort noise injection techniques in a sound decoder.

A stereo comfort noise injection technique will be described, by way of non-limitative example only, with reference to a parametric stereo sound decoder in an IVAS coding framework referred to throughout the present disclosure as IVAS codec (or IVAS sound codec). However, it is within the scope of the present disclosure to incorporate such multi-channel comfort noise injection techniques in any other types of multi-channel sound decoder and codec.

1. Introduction

Mobile communication scenarios involving stereophonic signal capture may use low-bitrate parametric stereo coding as described, for example, in References [2] or [3]. In a low-bitrate parametric stereo encoder, a single transmission channel is usually used to transmit the mono down-mixed sound signal. The down-mixing process is designed to extract a signal from a principal direction of incoming sound. The quality of representation of the mono down-mixed signal is to a large extent determined by the underlying core codec. Due to the limitations of the available bit budget the quality of the decoded mono down-mixed signal is often mediocre, especially in the presence of background noise as described in Reference [5], of which the full content is herein incorporated by reference. As a non-limitative example, in case of a CELP-based core codec, the available bit budget is distributed among coding of various components such as the spectral envelope, adaptive codebook, fixed codebook, adaptive-codebook gain, and fixed codebook gain of the excitation signal. In active segments of a noisy speech signal the amount of bits allocated to coding of the fixed codebook is not sufficient for a transparent representation thereof. Spectral holes can be observed in the spectrogram of the synthesized sound signal in certain frequency regions, for example between the formants. When listening to the synthesized sound signal the background noise is perceived as intermittent, thereby reducing the performance of the parametric stereo encoder.

A technical effect of the method and device according to the present disclosure for stereo comfort noise injection in a decoded sound signal at the decoder of a sound codec, in particular but not exclusively a parametric stereo decoder, is to reduce the negative effect of insufficient background noise representation in the codec. The decoded sound signal is analyzed during inactive segments where background noise is assumed to be present without speech. A long-term estimate of the spectral envelope of the background noise is calculated and stored in the memory of the decoder. A synthetically-made copy of the background noise is then generated in active segments of the decoded sound signal and injected in this decoded sound signal. The method and device for stereo comfort noise injection according to the present disclosure is different from the so-called "comfort noise addition" applied in, for example, the EVS codec (Reference [1]). The differences include, amongst others at least the following aspects:

- The estimation of the background noise spectral envelope in the parametric stereo decoder is performed by means of Infinite Impulse Response (IIR) filtering combined with adaptive boosting of the obtained, filtered spectrum in frequency partitions with high amount of averaging.
- Stereo comfort noise generation and injection is performed in the up-mixed stereo signal, separately in the left channel and the right channel.

The disclosed method and device for stereo comfort noise injection can be part of the parametric stereo decoder of an IVAS sound codec.

2. Parametric Stereo Decoder

FIG. 1 is a schematic block diagram illustrating concurrently a parametric stereo decoder 100 and a corresponding parametric stereo decoding method 150, including the device for stereo comfort noise injection and the method for stereo comfort noise injection.

As already mentioned, the stereo comfort noise injection device and method are described, by way of non-limitative example only, with reference to a parametric stereo decoder in an IVAS sound codec.

2.1 Demultiplexer

Referring to FIG. 1, the parametric stereo decoding method 150 comprises an operation 151 of receiving a bitstream from a parametric stereo encoder of the IVAS sound codec. To perform operation 151, the parametric stereo decoder 100 comprises a demultiplexer 101.

The demultiplexer 101 recovers from the received bitstream (a) the coded mono down-mixed signal 131, for example in time-domain and (b) the coded stereo parameters 132 such as the above mentioned ILD, ITD and/or IC binaural cues and possibly the above mentioned quantized residual signal resulting from the down-mixing.

2.2 Core Decoder

The parametric stereo decoding method 150 of FIG. 1 comprises an operation 152 of core decoding the coded mono down-mixed signal 131. To perform operation 152, the parametric stereo decoder 100 comprises a core decoder 102.

According to a non-limitative example, the core decoder 102 may be a CELP (Code-Excited Linear Prediction)-based core codec. The core decoder 102 then uses CELP technology to obtain a decoded mono down-mixed signal 133, in time-domain, from the received coded mono down-mixed signal 131.

It is within the scope of the present disclosure to use other types of core decoder technologies such as ACELP (Algebraic Code-Excited Linear Prediction), TCX (Transform-Coded eXcitation) or GSC (Generic audio Signal Coder).

Additional information about CELP, ACELP, TCX and GSC decoders may be found, for example, in Reference [1].

2.3 Stereo Parameters Decoder

Referring to FIG. 1, the parametric stereo decoding method 150 comprises an operation 160 of decoding the coded stereo parameters 132 from the demultiplexer 101 to obtain decoded stereo parameters 145. To perform operation 160, the parametric stereo decoder 100 comprises a decoder 110 of the stereo parameters.

Obviously, the stereo parameters decoder 110 uses decoding technique(s) corresponding to those that have been used to code the stereo parameters 132.

For example, if the above-mentioned binaural cues, residual signal and signalling information are coded using an entropy coding technique, e.g. arithmetic coding, the decoder 110 uses corresponding entropy/arithmetic decoding techniques to recover these binaural cues, residual signal and signalling information.

2.4 Frequency Transform

Referring to FIG. 1, the parametric stereo decoding method 150 comprises an operation 154 of frequency transforming the decoded mono down-mixed signal 133. To perform operation 154, the parametric stereo decoder 100 comprises a frequency transform calculator 104.

The calculator 104 transforms the time-domain, decoded mono down-mixed signal 133 into a frequency-domain mono down-mixed signal 135. For that purpose, the calculator 104 uses a frequency transform such as a Discrete Fourier Transform (DFT) or a Discrete Cosine Transform (DCT).

2.5 Stereo Up-Mixing

The parametric stereo decoding method 150 comprises an operation 155 of stereo up-mixing the frequency-domain mono down-mixed signal 135 from the frequency transform calculator 104 and the decoded stereo parameters 145 from the stereo parameters decoder 110 to produce frequency-domain left channel 136 and right channel 137 of the decoded stereo sound signal. To perform operation 154, the parametric stereo decoder 100 comprises a stereo up-mixer 105.

An example of stereo up-mixing of the frequency-domain mono down-mixed signal 135 from the frequency transform calculator 104 and the decoded stereo parameters 145 from the stereo parameters decoder 110 to produce frequency-domain left channel 136 and right channel 137 is described for example in Reference [2], Reference [3], and Reference [6], of which the full content is incorporated herein by reference.

2.6 Inverse Frequency Transform

The parametric stereo decoding method 150 comprises an operation 157 of inverse frequency transforming the up-mixed frequency-domain left 138 and right 139 channels. To perform operation 157, the parametric stereo decoder 100 comprises an inverse frequency transform calculator 107.

Specifically, the calculator 107 inverse transforms the frequency-domain left channel 138 and right channel 139 into time-domain left channel 140 and right channel 141. For example, if the calculator 104 uses a discrete Fourier transform, the calculator 107 uses an inverse discrete Fourier transform. If the calculator 104 uses a DCT transform, the calculator 107 uses an inverse DCT transform.

Additional information regarding parametric stereo encoders and decoders can be found, for example, in Reference [2], [3] and [6].

3. Stereo Comfort Noise Injection

As described herein below, the parametric stereo decoding method 150 of FIG. 1 includes a stereo comfort noise injection method and the parametric stereo decoder 100 of FIG. 1 includes a stereo comfort noise injection device.

3.1 Background Noise Estimation

Referring to FIG. 1, the stereo comfort noise injection method of the parametric stereo decoding method 150 comprises an operation 153 of background noise estimation. To perform operation 153, the stereo comfort noise injection device of the parametric stereo decoder 100 comprises a background noise estimator 103.

The background noise estimator 103 of the parametric stereo decoder 100 of FIG. 1 estimates a background noise envelope for example by analyzing the decoded mono down-mixed signal 133 during speech inactivity. The background noise envelope estimation process is carried out in short frames, having usually a duration between 15 and 30 ms. Frames of given duration, each including a given number of sub-frames and including a given number of successive sound signal samples, are used for processing sound signals in the field of sound signal coding, further information about such frames can be found, for example, in Reference [1].

The information about speech inactivity may be calculated in the parametric stereo encoder (not shown) of the IVAS sound codec using a Voice Activity Detection (VAD) algorithm similar to that used in the EVS codec (Reference [1]) and transmitted to the parametric stereo decoder 100 as a binary VAD flag $f_{VAD}$ in the bitstream received by the demultiplexer 101. Alternatively, the binary VAD flag $f_{VAD}$ can be coded as part of an encoder type parameter, for example as described in the EVS codec (Reference [1]). The encoder type parameter in the EVS codec is selected from the following set of signal classes: INACTIVE, UNVOICED, VOICED, GENERIC, TRANSITION and AUDIO. When the decoded encoder type parameter is INACTIVE the VAD flag $f_{VAD}$ is "0". In all other cases the VAD flag is "1". If the binary VAD flag $f_{VAD}$ is not transmitted in the bitstream and it cannot be deduced from the encoder type parameter, it can be calculated explicitly in the background noise estimator 103 by running the VAD algorithm on the decoded mono down-mixed signal 133. The VAD flag $f_{VAD}$ in the parametric stereo decoder 100 may be expressed using, for example, the following relation (1):

$$f_{VAD}(n) = \begin{cases} 0 & \text{when frame is inactive} \\ 1 & \text{when frame is active} \end{cases}, \; n = 0, \ldots, N-1 \tag{1}$$

with n being an index of the sample of decoded mono down-mixed signal 133 and N the total number of samples in the current frame (length of the current frame). The decoded mono down-mixed signal 133 is denoted as $m_d(n)$, n=0, . . . , N−1.

The estimation of the background noise envelope by analyzing the decoded mono down-mixed signal 133 during speech inactivity will be described herein after in section 3.1.1-3.1.5.

3.1.1 Power Spectrum Compression

Figure 2:
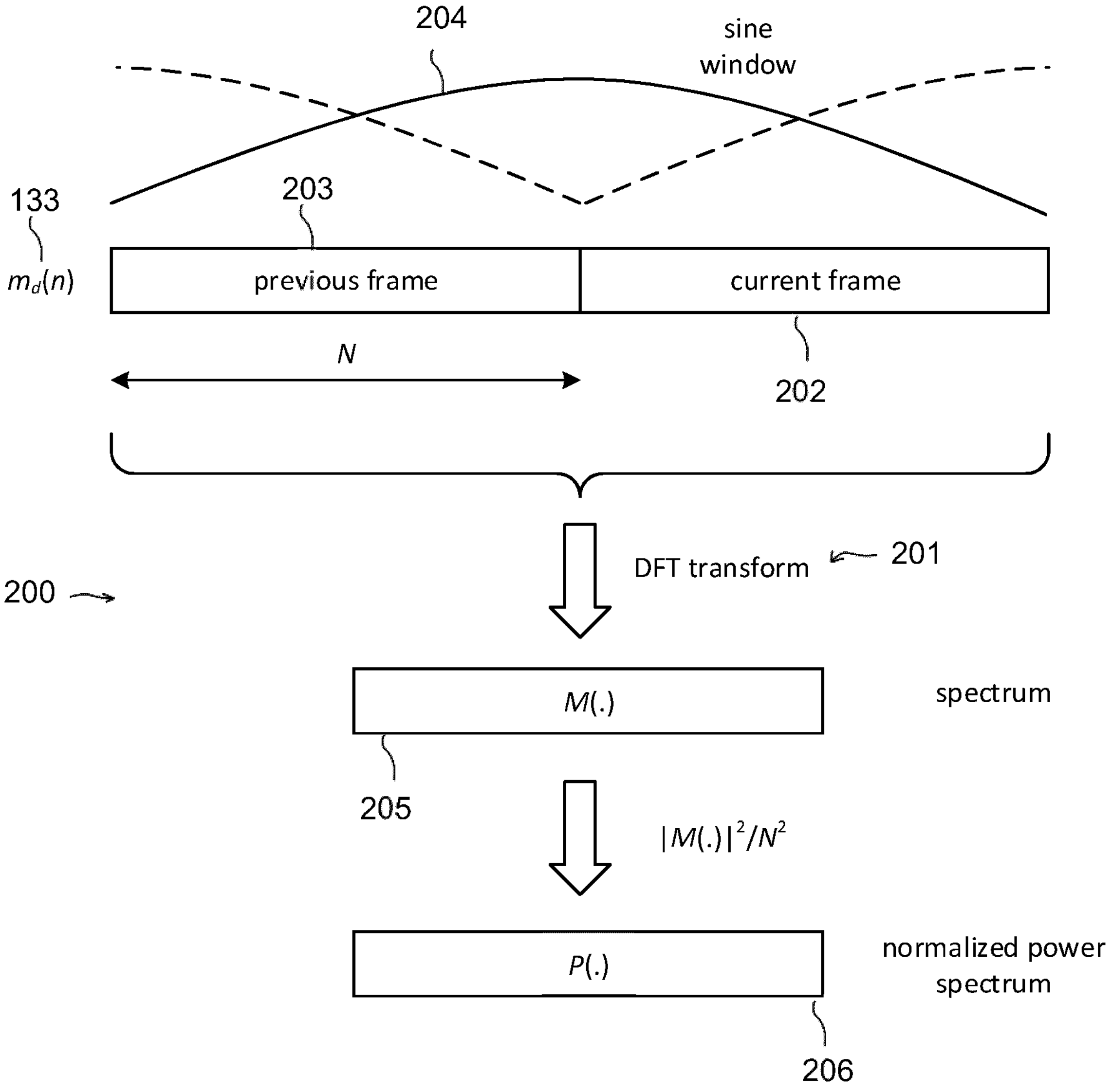
FIG. 2 is a schematic diagram illustrating concurrently a converter of the mono down-mixed signal to frequency domain and an operation of converting the mono down-mixed signal to frequency domain.

The background noise estimator 103 converts the decoded mono down-mixed signal 133 to frequency-domain using a DFT transform. The DFT transformation process 200 is illustrated in the schematic diagram of FIG. 2. The input to the DFT transform 201 comprises the current frame 202 and the previous frame 203 of the decoded mono down-mixed signal 133. Therefore, the length of the DFT transform is 2N.

To reduce the effects of spectral leakage occurring at frame borders, the decoded mono down-mixed signal 133 is first multiplied with a tapered window, for example the normalized sine window 204. The raw sine window $w_s(n)$ may be expressed using the following relation (2):

$$w_s(n) = \sin\left(\pi\frac{n+0.5}{2N}\right),\ n = 0,\ \ldots\ ,\ 2N-1 \tag{2}$$

The sine window $w_s(n)$ is normalized ($w_{sn}(n)$) using, for example, the following relation (3):

$$w_{sn}(n) = \frac{w_s(n)}{\sqrt{\frac{1}{2N}\sum_{n=0}^{2N-1} w_s^2(n)}},\ n = 0,\ \ldots\ ,\ 2N-1 \tag{3}$$

The decoded mono down-mixed signal 133 ($m_d(n)$) is windowed ($m_w(n)$) with the normalized sine window $w_{sn}(n)$ using, for example, the following relation (4):

$$m_w(n)=m_d(n)w_{sn}(n),n=0,\ .\ .\ .\ ,2N-1 \tag{4}$$

The windowed decoded mono down-mixed signal $m_w(n)$ is then transformed with the DFT transform 201 using, for example, the following relation (5):

$$M(k) = \sum_{n=0}^{2N-1} m_w(n)\cdot e^{-j2\pi\frac{kn}{2N}},\ k = 0,\ \ldots\ ,\ 2N-1 \tag{5}$$

As the input, decoded mono down-mixed signal 133 is real, its spectrum (see 205 in FIG. 2) is symmetric and only the first half, i.e. the N first spectral bins (k), is taken into account when calculating the power spectrum of the decoded mono down-mixed signal 133. This may be expressed using the following relation (6):

$$P(k) = \frac{1}{N^2}|M(k)|^2,\ k = 0,\ \ldots\ ,\ N-1 \tag{6}$$

As can be seen from relation (6), the power spectrum (see 206 in FIG. 2) of the decoded mono down-mixed signal 133 is normalized ($1/N^2$) to get the energy per sample.

Figure 3:
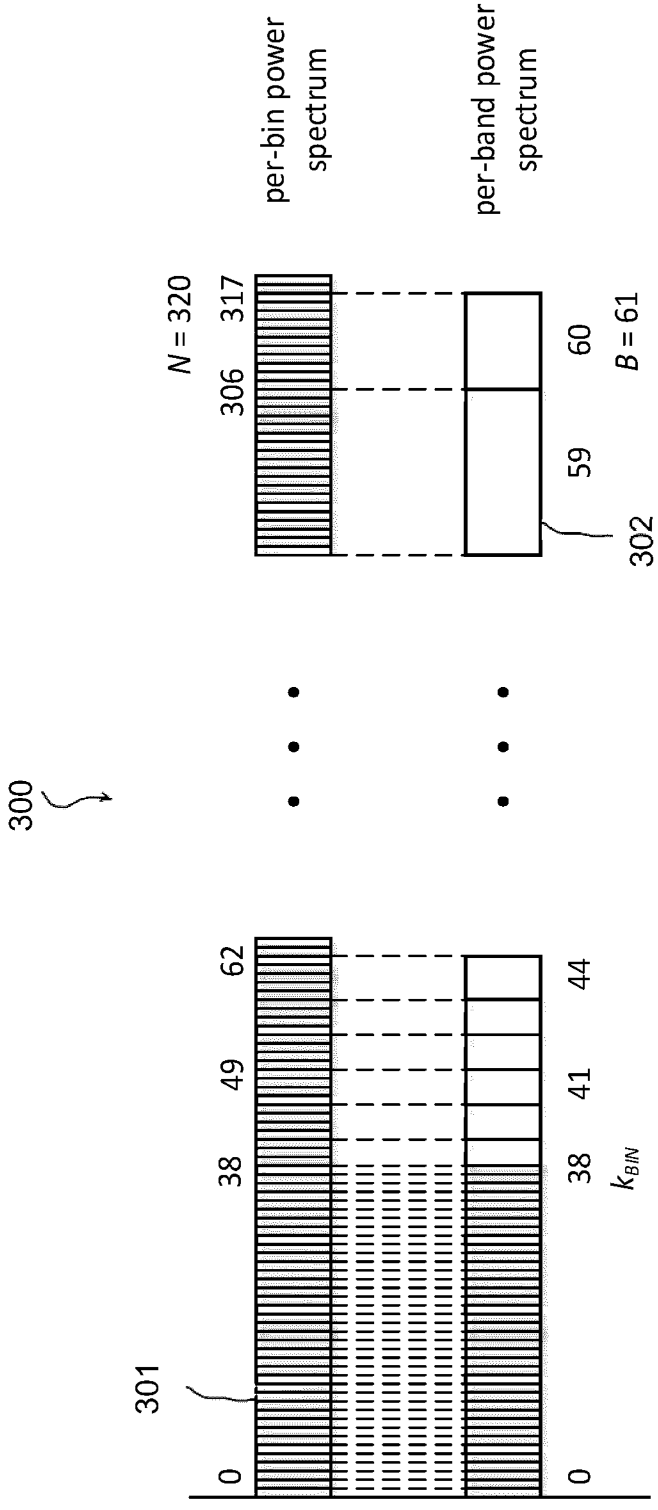
FIG. 3 is a graph showing power spectrum compression.

The normalized power spectrum P(k) is compressed in the frequency domain by compacting frequency bins into frequency bands. As a non-limitative example, let's assume that the decoded mono down-mixed signal 133 is sampled at a sampling frequency of 16 kHz and the length of a frame is 20 ms. The total number of samples in every frame is N=320 and the length of the FFT (Fast Fourier Transform used to calculate the DFT) transform is 2N=640. Let's denote the total number of frequency bands as B. The process 300 of compacting spectral bins in frequency bands is illustrated in FIG. 3 for the exemplary case of N=320. In this example, 320 bins 301 of the normalized power spectrum P(k) spanning the range of 0 Hz to 8 kHz are compressed into B=61 frequency bands 302.

Human auditory system is more sensitive to spectral content at low frequencies. Therefore, in the example of partitioning scheme of FIG. 3, single-bin partitions are defined up to $f_{BIN}$=950 Hz. Let's denote the index corresponding to this frequency as $k_{BIN}$. In this exemplary case, the last frequency index for bin-wise partitioning is set to $k_{BIN}$=38. For low frequencies, up to $k_{BIN}$, no spectral compression is done and the bin-wise power spectrum is simply copied to the band-wise (compressed) power spectrum. This can be expressed using, for example, the following relation (7):

$$N(k)=P(k),k=0,\ .\ .\ .\ ,k_{BIN} \tag{7}$$

For frequencies higher than $k_{BIN}$, the background noise estimator 103 compresses the bin-wise power spectrum by means of spectral averaging of the frequency bins of the power spectrum P(k) in the corresponding frequency band. This is done by first calculating a mean $N_0(b)$ of the power spectrum P(k) in each frequency band using, for example, the following relation (8):

$$N_0(b) = \frac{1}{(k_{high}(b) - k_{low}(b) + 1)}\sum_{k=k_{low}(b)}^{k_{high}(b)} P(k),\quad b = k_{BIN}+1,\ \ldots\ ,\ B-1 \tag{8}$$

where b represents the frequency band and the range $\langle k_{low}(b), k_{high}(b)\rangle$ identifies the set of frequency bins of a $b^{th}$ frequency band, of which $k_{low}(b)$ is the lowest frequency bin and $k_{high}(b)$ is the highest frequency bin. In the exemplary case of a number N=320 of frequency bins, the assignment of frequency bins to frequency bands is defined in Table 1, where $k_{mid}(b)$ represents the middle frequency bin of a frequency band b.

TABLE 1

Power Spectrum Partitioning Scheme for a 16 kHz Signal

| band b | lower bound $k_{low}$ | upper bound $k_{high}$ | middle point $k_{mid}$ |
|---|---|---|---|
| 0 | 0 | 0 | — |
| 1 | 1 | 1 | — |
| 2 | 2 | 2 | — |
| . . . | . . . | . . . | — |
| 37 | 37 | 37 | — |
| 38 | 38 | 38 | — |
| 39 | 39 | 41 | 40 |
| 40 | 42 | 45 | 43 |
| 41 | 46 | 49 | 47 |
| 42 | 50 | 53 | 51 |
| 43 | 54 | 57 | 55 |
| 44 | 58 | 62 | 60 |
| 45 | 63 | 67 | 65 |
| 46 | 68 | 72 | 70 |
| 47 | 73 | 78 | 75 |
| 48 | 79 | 84 | 81 |
| 49 | 85 | 91 | 88 |
| 50 | 92 | 98 | 95 |
| 51 | 99 | 106 | 102 |
| 52 | 107 | 115 | 111 |
| 53 | 116 | 124 | 120 |
| 54 | 125 | 134 | 129 |
| 55 | 135 | 146 | 140 |
| 56 | 147 | 174 | 160 |

TABLE 1-continued

| Power Spectrum Partitioning Scheme for a 16 kHz Signal | | | |
|---|---|---|---|
| band b | lower bound $k_{low}$ | upper bound $k_{high}$ | middle point $k_{mid}$ |
| 57 | 175 | 210 | 192 |
| 58 | 211 | 254 | 232 |
| 59 | 255 | 306 | 280 |
| 60 | 307 | 317 | 312 |

3.1.2 Compensation for the Loss of Variance

The above described spectral averaging of relation (8) tends to reduce the variance of the background noise. To compensate for the loss of variance, the background noise estimator 103 adds random gaussian noise to the mean power spectrum. This is done as follows. First, the background noise estimator 103 calculates a variance σ(b) of the random gaussian noise in each frequency band b using, for example, the following relation (9):

$$\sigma(b) = \frac{1}{(k_{high}(b) - k_{low}(b) + 1)} \sum_{k=k_{low}(b)}^{k_{high}(b)} [P(k) - N_0(b)]^2, \quad (9)$$

$$b = k_{BIN} + 1, \ldots, B - 1.$$

The random gaussian noise generated by the background noise estimator 103 has zero mean and a variance calculated using Equation (9) in each frequency band. The generated random gaussian noise is denoted as $N(0,\sigma_b^2)$. The addition N(b) of the generated random gaussian noise to the compressed power spectrum can then be expressed using relation (10):

$$N(b)=N_0(b)+N(0,\sigma_b^2), b=k_{BIN}+1, \ldots, B-1 \quad (10)$$

The values of the compressed power spectrum below $10^{-5}$ are limited. The addition of random gaussian noise to the mean power spectrum is only performed after an intialization procedure, which is explained later in the present disclosure.

3.1.3 Spectral Smoothing

The background noise estimator 103 smoothes the compressed power spectrum N(b) in the frequency domain by means of non-linear IIR filtering. The IIR filtering operation depends on the VAD flag $f_{VAD}$. As a general rule, the smoothing is stronger during inactive segments and weaker during active segments of the decoded stereo sound signal. The smoothed compressed power spectrum is denoted as $\tilde{N}(b)$, b=0, . . . , B−1.

For inactive segments of the decoded stereo sound signal, when the VAD flag $f_{VAD}$ is "0" in the current frame, the IIR smoothing is performed using, for example, the following relation (11):

$$\tilde{N}^{[m]}(b) = \begin{cases} 0.8 \cdot \tilde{N}^{[m-1]}(b) + 0.2 \cdot N^{[m]}(b), & \text{if } b \le k_{BIN} \text{ AND } N^{[m]}(b) < \tilde{N}^{[m-1]}(b) \\ 1.05 \cdot \tilde{N}^{[m-1]}(b), & \text{if } N^{[m]}(b) \ge 2\tilde{N}^{[m-1]}(b) \\ 0.95 \cdot \tilde{N}^{[m-1]}(b) + 0.05 \cdot N^{[m]}(b), & \text{otherwise} \end{cases} \quad (11)$$

where the index m in brackets has been added to denote the current frame. In the first line of relation (11) fast downward update of the compressed power spectrum is performed in single-bin partitions using a forgetting factor α of 0.8. In the second line of relation (11) only slow upward update is performed for all bands of the compressed power spectrum using a factor α of 1.05. The third line of relation (11) represents the default IIR filter configuration using a forgetting factor α of 0.95 for all cases other than those described by the conditions of the first and second lines of relation (11).

For active segments of the decoded stereo sound signal, when the VAD flag $f_{VAD}$ is "1" in the current frame, the background noise estimator 103 performs IIR smoothing only in some selected frequency bands. The smoothing operation is performed with an IIR filter having a forgetting factor proportional to the ratio between the total energy of the compressed power spectrum and the total energy of the smoothed compressed power spectrum.

The total energy $E_N$ of the compressed power spectrum can be calculated using, for example, the following relation (12):

$$E_N = \sum_{b=0}^{B-1} N(b) + 10^{-7} \quad (12)$$

The total energy $\tilde{E}_N$ of the smoothed compressed power spectrum can be calculated using, for example, the following relation (13):

$$\tilde{E}_N = \sum_{b=0}^{B-1} \tilde{N}^{[m-1]}(b) \quad (13)$$

The ratio $r_{enr}$ between the total energy $E_N$ of the compressed power spectrum and the total energy $\tilde{E}_N$ of the smoothed compressed power spectrum can be calculated using, for example, the following relation (14):

$$r_{enr} = \frac{E_N}{\tilde{E}_N + \varepsilon} \quad (14)$$

where ε is a small constant value added to avoid division by zero, for example $\varepsilon=10^{-7}$.

If the energy ratio $r_{enr}$ is lower than 0.5 then it means that total energy $E_N$ of the compressed power spectrum is significantly lower than the total energy $\tilde{E}_N$ of the smoothed compressed power spectrum. In this case, the smoothed compressed power spectrum $\tilde{N}^{[m]}(b)$ in the current frame m is updated using, for example, the following relation (15):

$$\tilde{N}^{[m]}(b)=r_{enr}\cdot\tilde{N}^{[m-1]}(b)+(1-r_{enr})\cdot N^{[m]}(b), b=0, \ldots, B-1 \text{ if } N^{[m]}(b)<\tilde{N}^{[m]}(b) \quad (15)$$

Thus, in all bands where significant energy drop is detected in the current frame the energy of the smoothed compressed power spectrum $\tilde{N}^{[m]}(b)$ is updated rather quickly, in proportion to the energy ratio $r_{enr}$.

If the energy ratio $r_{enr}$ is higher than or equal to 0.5 the smoothed compressed power spectrum $\tilde{N}^{[m]}(b)$ is updated only in frequency bands above 2275 Hz. This corresponds to b≥50 in this illustrative embodiment. First, the background noise estimator 103 calculates a short-term average of the smoothed compressed power spectrum $\tilde{N}^{[m]}(b)$ using, for example, the following relation (16):

$$\tilde{N}_{ST}^{[m]}(b)=0.9\cdot\tilde{N}^{[m-1]}(b)+0.1\cdot N^{[m]}(b), b=50, \ldots, B-1 \quad (16)$$

where $\tilde{N}_{ST}^{[0]}(b)=0$ for b=50, . . . , B−1. The short-term smoothed compressed power spectrum is updated in every frame, regardless of the value of $r_{enr}$. The background noise estimator 103 updates the smoothed compressed power spectrum $\tilde{N}^{[m]}(b)$ in frames where $r_{enr} \geq 0.5$ using, for example, the following relation (9):

$$\tilde{N}^{[m]}(b)=0.7\cdot\tilde{N}^{[m-1]}(b)+0.3\cdot\tilde{N}_{ST}^{[m]}(b), b=50, \ldots, B-1 \quad \text{if } \tilde{N}_{ST}^{[m]}(b)<\tilde{N}^{[m-1]}(b) \tag{17}$$

Again, only downward update (energy drop is detected in the current frame) is allowed but the update is slower compared to the case when $r_{enr}<0.5$.

The update of the smoothed compressed power spectrum $\tilde{N}^{[m]}(b)$, as described in this section 3.1.3, is modified during an initialization procedure, which will be explained in the next section of the present disclosure.

3.1.4 Initialization Procedure

Figure 4:
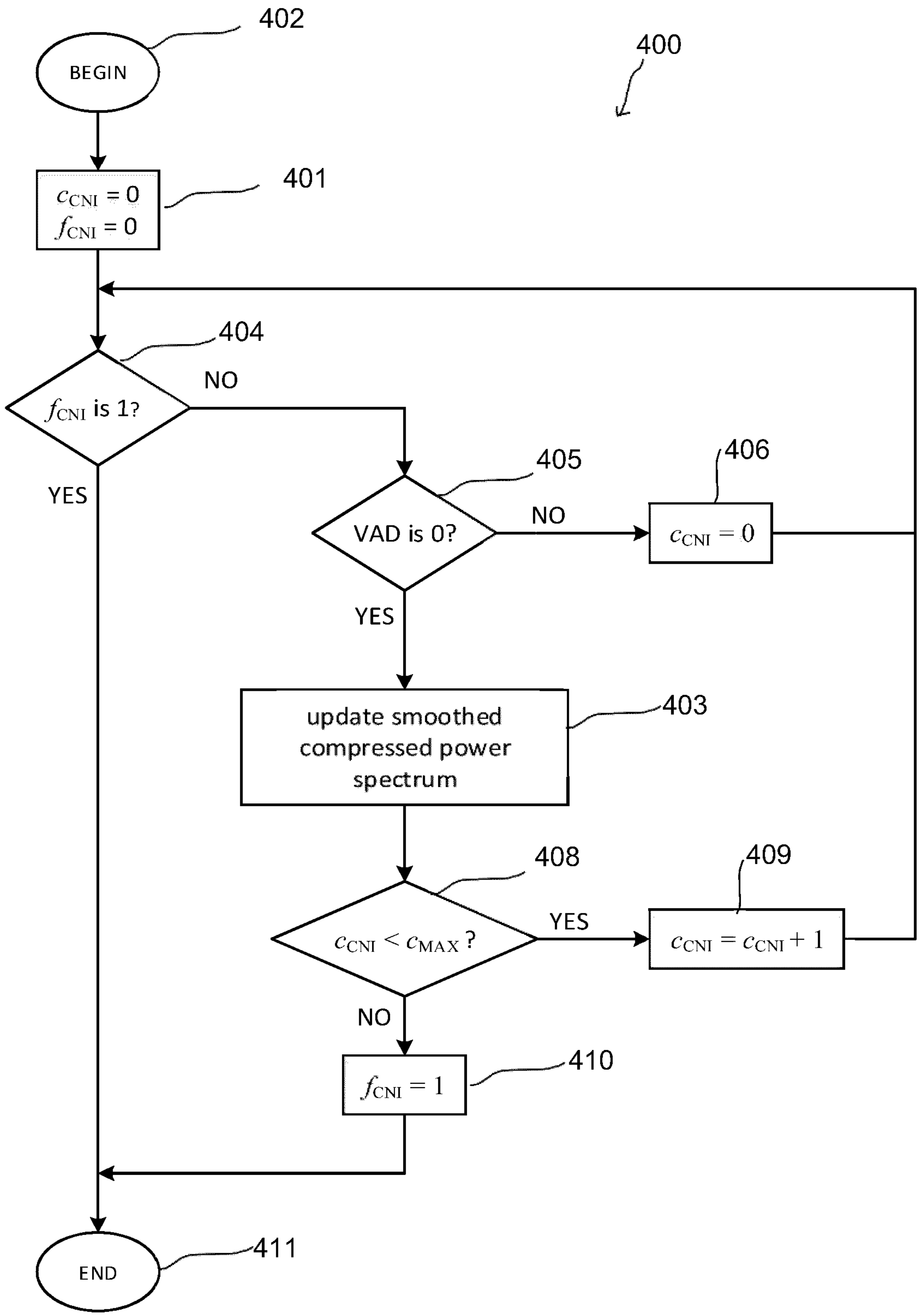
FIG. 4 is a schematic flow chart showing an initialization procedure of a background noise estimation operation.

The background noise estimation operation 153 requires proper initialization. FIG. 4 is a schematic flow chart showing an initialization procedure of the background noise estimation operation 153. During such initialization procedure 400, the background noise estimator 103 updates the smoothed compressed power spectrum $\tilde{N}^{[m]}(b)$ using a successive IIR filter.

The background noise estimator 103 uses a counter $c_{CNI}$ of consecutive inactive frames ($f_{VAD}$="0") in which the smoothed compressed power spectrum $\tilde{N}^{[m]}(b)$ is updated. The counter $c_{CNI}$ is initialized to 0 (block 401 in FIG. 4) at the beginning (block 402 in FIG. 4) of the initialization procedure 400. The background noise estimator 103 also uses a binary flag $f_{CNI}$ for signaling whether the initialization procedure 400 is completed. The binary flag $f_{CNI}$ is also initialized to 0 (block 401 in FIG. 4) at the beginning of the initialization procedure 400. The counter $c_{CNI}$ and the flag $f_{CNI}$ are updated with a simple state machine described in FIG. 4.

Referring to FIG. 4, the initialization procedure 400 comprises, in each frame, the following sub-operations:

- If a binary flag $f_{CNI}$ is set to "1" (sub-operation 404), the initialization procedure 400 is completed and is ended (sub-operation 411).
- If the binary flag $f_{CNI}$ is set to "0" (sub-operation 404) and the binary VAD flag $f_{VAD}$ is set to "1" (sub-operation 405) indicating an active frame, the counter $c_{CNI}$ is reset to 0 (sub-operation 406), and the initialization procedure 400 returns to sub-operation 404.
- If the binary flag $f_{CNI}$ is set to "0" (sub-operation 404) and the binary VAD flag $f_{VAD}$ is set to "0" (sub-operation 405) indicating an inactive frame, the background noise estimator 103 updates the smoothed compressed power spectrum $\tilde{N}^{[m]}(b)$ by means of the successive IIR filter (sub-operation 403).
- Following the update of the smoothed compressed power spectrum $\tilde{N}^{[m]}(b)$ in sub-operation 403, the counter $c_{CNI}$ is compared to a parameter $c_{MAX}$ of given value (sub-operation 408).
- If the comparison in sub-operation 408 indicates that the counter $c_{CNI}$ is smaller than the parameter $c_{MAX}$, the counter $c_{CNI}$ is incremented by "1" (sub-operation 409) and the initialization procedure 400 returns to sub-operation 404.
- If the comparison in sub-operation 408 indicates that the counter $c_{CNI}$ is equal to or larger than the parameter $c_{MAX}$, the binary flag $f_{CNI}$ is set to "1" (sub-operation 410) and the initialization procedure 400 is completed and ended (sub-operation 411).

As can be seen, the initialization procedure 400 is completed after the smoothed compressed power spectrum $\tilde{N}^{[m]}(b)$ has been updated in a given number of consecutive inactive frames. This is controlled by the parameter $c_{MAX}$. As a non-limitative example, the parameter $c_{MAX}$ is set to 5. Setting the parameter $c_{MAX}$ to a higher value may lead to an initialization procedure 400 of the background noise estimation operation 153 which is more stable but which requires a longer period of time to complete the initialization. As the smoothed compressed power spectrum $\tilde{N}^{[m]}(b)$ is used for stereo comfort noise injection and also during Discontinuous Transmission (DTX) operation it is not advisable to extend the initialization period too much. Further information about the DTX operation can be found, for example, in Reference [1].

During the initialization procedure 400, the background noise estimator 103 updates (sub-operation 403) the smoothed compressed power spectrum $\tilde{N}^{[m]}(b)$ with the successive IIR filter using, for example, the following relation (18):

$$\tilde{N}^{[m]}(b)=\left(1-\frac{1}{c_{CNI}+1}\right)\cdot\tilde{N}^{[m-1]}(b)+\frac{1}{c_{CNI}+1}\cdot\tilde{N}_{ST}^{[m]}(b), \quad b=0, \ldots, B-1 \tag{18}$$

in which [m] is the frame index and $\tilde{N}_{ST}^{[0]}(b)=0$ for b=0, . . . , B−1. Thus, the forgetting factor $\alpha=1/(c_{CNI}+1)$ is proportional to the counter $c_{CNI}$. Therefore to the number of inactive frames in which the smoothed compressed power spectrum $\tilde{N}^{[m]}(b)$ has been updated. With this initialization procedure 400, the smoothed compressed power spectrum $\tilde{N}^{[m]}(b)$ contains meaningful spectral information about the background noise. In case it happens, for example, that DTX operation is detected in the decoder before the initialization procedure is completed, it is still possible to use the smoothed compressed power spectrum $\tilde{N}^{[m]}(b)$ as an estimate of the background noise.

3.1.5 Power Spectrum Expansion

Similarly to power spectrum compression as illustrated in FIG. 3 and described in Section 3.1.1, the background noise estimator 103 performs the inverse sub-operation of expanding the smoothed compressed power spectrum $\tilde{N}^{[m]}(b)$. For low frequencies, up to $k_{BIN}$, no expansion takes places and the band-wise compressed power spectrum is copied to the bin-wise (expanded) power spectrum using, for example, the following relation (19):

$$\tilde{P}(k)=\tilde{N}(k), k=0, \ldots, k_{BIN} \tag{19}$$

For frequencies higher than $k_{BIN}$, the background noise estimator 103 expands the band-wise compressed power spectrum by means of linear interpolation in the logarithmic domain as described in Reference [1]. For that purpose, the background noise estimator 103 first calculates a multiplicative increment $\beta_{mult}$ using, for example, the following relation (20):

$$\beta_{mult}(b)=\exp\left(\frac{\log(\tilde{N}(b))-\log(\tilde{N}(b-1))}{k_{mid}(b)-k_{mid}(b-1)}\right), \quad b=k_{BIN}+1, \ldots, B-1 \tag{20}$$

where b identifies the frequency band and $k_{mid}(b)$ the middle bin of the $b^{th}$ band. The expanded power spectrum is then calculated for all $b=k_{BIN}+1, \ldots, B-1$ using, for example, the following relation (21):

$$\tilde{P}(k)=\tilde{N}(b-1)\cdot[\beta_{mult}(b)]^{(k-k_{mid}(b-1))}, k=k_{mid}(b-1)+1, \ldots, k_{mid}(b) \quad (21)$$

In relations (20) and (21), the frame index [m] has been omitted for simplicity.

As the expanded power spectrum $\tilde{P}(k)$ is calculated according to relations (19) and (21) during inactive frames, it represents an estimation of the background noise in the decoded mono down-mixed signal 133.

3.2 Stereo Comfort Noise Injection

Referring back to FIG. 1, the parametric stereo decoding method 150 comprises an operation 156 of injection of comfort noise in the left channel 136 and the right channel 137 from the stereo up-mixer 105. To perform operation 156, the parametric stereo decoder 100 comprises a stereo comfort noise injector 106.

The stereo Comfort Noise Injection (CNI) technology of operation 156 is based on the Comfort Noise Addition (CNA) technology, originally developed and integrated in the 3GPP EVS Codec (Reference [1]). The purpose of the CNA in the EVS codec is to compensate for the loss of energy arising from ACELP-based coding of noisy speech signals (Reference [5]). The loss of energy is especially noticeable at low bitrates, when the number of available bits in the ACELP encoder is insufficient to encode the fixed contribution (fixed codebook index and gain) of the excitation. As a result, the energy of the decoded signal in spectral valleys between speech formants is lower than the energy in the original signal. This leads to an undesirable effect of "noise attenuation", negatively perceived by the listeners. Addition of random noise with proper level and spectral shape efficiently covers the spectral valleys, thereby boosting the noise floor and resulting in an uninterrupted perception of the background noise. In the EVS decoder, comfort noise is generated and added to the decoded signal in the frequency domain.

It is possible to generate and inject the comfort noise into the decoded mono down-mixed signal 133 of the parametric stereo decoder 100. However, the decoded mono down-mixed signal 133 is converted into the left channel 136 and the right channel 137 during the stereo up-mixing operation 155. As the spatial properties of the dominant sound, represented by the decoded mono down-mixed signal 133, and the spatial properties of the surrounding (background) noise can be very different this could lead to undesirable spatial unmasking effects. To circumvent this problem the comfort noise is generated after the stereo up-mixing operation 155 and injected separately into the left channel 136 and the right channel 137. The spatial properties of the background noise are estimated directly in the decoder, during inactive segments.

3.2.1 Estimation of Background Noise Spatial Properties in the Decoder

Assuming decoder 100 running in a non-DTX operation mode, the spatial properties of the background noise can be estimated during inactive segments of the decoded stereo sound signal signaled by a VAD flag $f_{VAD}$ set to "0". The key spatial parameter is the inter-channel coherence (ICC). As the estimation of the ICC parameter involves conversion of the decoded stereo signal (left channel and right channel) to frequency domain, it may be too complex to calculate such ICC parameter. A reasonable approximation of the ICC parameter is the inter-channel correlation (IC) parameter that can be calculated in the time domain. The IC parameter may be calculated by the stereo comfort noise injector 106 using, for example, the following relation (22):

$$IC_{LR}^{[m]} = \frac{\left|\sum_{n=0}^{N-1} l(n)\cdot r(n)\right|}{\sqrt{\sum_{n=0}^{N-1} l^2(n)\cdot \sum_{n=0}^{N-1} r^2(n)}} \quad (22)$$

where l(n) and r(n) are respectively the left channel and the right channel of the decoded stereo sound signal in time domain calculated from the left channel 136 and right channel 137 in frequency domain using the frequency transform inverse to that used in calculator 104, N is the number of samples in a current frame, [m] is the frame index, and the index LR refers to left (L) and right (R) to show that the parameter IC relates to correlation between the left and right channels.

A second spatial parameter estimated in the decoder 100 is the inter-channel level difference (ILD). The stereo comfort noise injector 106 may calculate the parameter ILD by expressing a ratio $c_{LR}$ between the energy of the left channel l(n) and the energy of the right channel r(n) of the decoded stereo sound signal in the current frame using, for example, the following relation (23):

$$c_{LR} = \frac{\sum_{n=0}^{N-1} l^2(n)}{\sum_{n=0}^{N-1} r^2(n)} \quad (23)$$

and then calculate the ILD parameter using, for example, the following relation (24):

$$ILD_{LR}^{[m]} = \frac{c_{LR}-1}{c_{LR}+1} \quad (24)$$

As both the IC and ILD spatial parameters are calculated from a same, single frame their fluctuation is high. Therefore, the stereo comfort noise injector 106 smooths the IC and ILD spatial parameters by means of IIR filtering. The smoothed inter-channel correlation (IC) parameter may be calculated using, for example, the following relation (25):

$$\widetilde{IC}_{LR}^{[m]}=0.95\cdot \widetilde{IC}_{LR}^{[m-1]}+0.05\cdot IC_{LR}^{[m]} \quad (25)$$

and the smoothed inter-channel level difference (ILD) parameter may be calculated using, for example, the following relation (26):

$$\widetilde{ILD}_{LR}^{[m]}=0.9\cdot \widetilde{ILD}_{LR}^{[m-1]}+0.1\cdot ILD_{LR}^{[m]} \quad (26)$$

During the initialization procedure 400 of FIG. 4, when $f_{CNI}=0$, the stereo comfort noise injector 106 sets the smoothed IC and ILD parameters to their instantaneous values as follows:

$$\widetilde{IC}_{LR}^{[m]}=IC_{LR}^{[m]}, \text{ if } f_{CNI}=0 \quad (27)$$

$$\widetilde{ILD}_{LR}^{[m]}=ILD_{LR}^{[m]}, \text{if } f_{CNI}=0$$

The initial values for $\widetilde{IC}_{LR}^{[0]}$ and $\widetilde{ILD}_{LR}^{[0]}$ are "0".

3.2.2 Stereo Comfort Noise Generation and Injection

The stereo comfort noise injector 106 generates and injects the stereo comfort noise in the frequency domain. In the following, non-restrictive example of implementation:

- The complex spectrum of the left channel 136 of the decoded stereo sound signal in frequency domain is denoted as L(k), where k=0, . . . , M−1 and M is the length of the FFT transform used in frequency transform operation 154.
- The complex spectrum of the right channel 137 of the decoded stereo sound signal in frequency domain is denoted as R(k), where k=0, . . . , M−1.

The previous non-limitative implementation example where the decoded mono down-mixed signal is sampled at 16 kHz and the background noise is estimated in the frequency range of 0 to 8000 Hz will be followed. For successful background noise injection in the up-mix domain (left channel 136 and right channel 137), the sampling rate of the left channel 136 and the right channel 137 will be at least 16 kHz. If it is assumed, as a non-limitative example, that the left 136 and right 137 channels of the decoded stereo sound signal are sampled at 32 kHz with a number M=640 of samples by frame. This corresponds to a FFT length of 20 ms which is also the frame length in the parametric stereo decoder 100. Thus, the frequency resolution of the background noise spectrum P is 25 Hz whereas the frequency resolution of the spectrum of the left channel 136 and the right channel 137 of the decoded stereo sound signal is 50 Hz. The mismatch of frequency resolution can be resolved during stereo comfort noise generation by averaging the level of the background noise in two adjacent spectral bins as explained in the following description.

The stereo comfort noise injector 106 generates two random signals with Gaussian Probability Density Functions (PDF) using, for example, the following relations (28):

$$G_1(k) \sim N(0,1)$$

$$G_2(k) \sim N(0,1) \tag{28}$$

for k=0, . . . , M−1, M being the number of samples by frame. The two random signals $G_1(k)$ and $G_2(k)$ are mixed together to create a left channel and a right channel of the stereo comfort noise. The mixing is designed to match the spatial properties of the estimated background noise represented by the smoothed inter-channel correlation (IC) parameter described in relation (25) and the smoothed inter-channel level difference (ILD) parameter described in relation (26). The stereo comfort noise injector 106 calculates a mixing factor $\gamma$ using, for example, the following relation (29):

$$\gamma = \sqrt{\frac{\widetilde{IC}_{LR}^{[m]}}{1-\widetilde{IC}_{LR}^{[m]}} + 1 - \left[\widetilde{ILD}_{LR}^{[m]}\right]^2} - \sqrt{\frac{\widetilde{IC}_{LR}^{[m]}}{1-\widetilde{IC}_{LR}^{[m]}}} \tag{29}$$

The spectral envelope of the stereo comfort noise (comfort noise for the left and right channels) is controlled with the expanded power spectrum (estimated background noise in the decoded mono down-mixed signal 133) calculated in relations (19) and (21). Also, the frequency resolution of the expanded power spectrum is reduced by a factor "2".

The minimum and the maximum level in each pair of adjacent frequency bins of the expanded power spectrum $\tilde{P}(k)$ may be expressed using, for example, the following relations (30):

$$\tilde{P}_{min}(k)=\min(\tilde{P}(2k),\tilde{P}(2k+1)),\text{for } k=0, \ldots, N/2-1$$

$$\tilde{P}_{max}(k)=\max(\tilde{P}(2k),\tilde{P}(2k+1)),\text{ for } k=0, \ldots, N/2-1 \tag{30}$$

where N is the number of frequency bins and k is the frequency bin index.

The stereo comfort noise injector 106 then carries out a reduction of the frequency resolution using, for example, the following relations (31):

$$L_{CN}(k) = \begin{cases} \tilde{P}_{min}(k), & \text{if } \tilde{P}_{max}(k)/\tilde{P}_{min}(k) > 1.2 \\ 0.5(\tilde{P}(2k)+\tilde{P}(2k+1)), & \text{otherwise} \end{cases}, \tag{31}$$
$$\text{for } k=0, \ldots, N/2-1$$

Thus, according to relation (31) the level of the comfort noise for injection in the frequency domain left channel 136 and right channel 137 is set to the minimum level in two adjacent frequency bins of the expanded power spectrum $\tilde{P}(k)$ if the ratio between the maximum $\tilde{P}_{max}(k)$ and minimum $\tilde{P}_{min}(k)$ values of the expanded power spectrum $\tilde{P}(k)$ in adjacent frequency bins exceeds a threshold of 1.2. This prevents excessive comfort noise injection in signals with strong tilt of the estimated background noise. In all other situations, the level of the stereo comfort noise is set to an average level across the two adjacent frequency bins.

The stereo comfort noise injector 106 scales the level of the stereo comfort noise with a scaling factor $r_{scale}(k)$ calculated using a factor N/2 reflecting the new frame length and a global gain $g_{scale}$ using, for example, the following relation (32):

$$r_{scale}(k) = \frac{N}{2}\sqrt{0.5 \cdot g_{scale} \cdot L_{CN}(k)}, \text{ for } k=0, \ldots, N/2-1 \tag{32}$$

where N is the number of frequency bins, k is the frequency bin index, and $g_{scale}$ is the global gain that will be described herein after in the present disclosure.

The mixing of two random signals with Gaussian PDF can be described, for example, by the following pair of equations (33):

$$N_L(k)=r_{scale}(k)[(1+\widetilde{ILD}_{LR}^{[m]})G_1(k)+\gamma G_2(k)], \text{ for } k=0, \ldots, N/2-1 \tag{33}$$

$$N_R(k)=r_{scale}(k)[(1-\widetilde{ILD}_{LR}^{[m]})G_1(k)-\gamma G_2(k)], \text{ for } k=0, \ldots, N/2-1$$

where $N_L(k)$ and $N_R(k)$ are the generated comfort noise signals for injection in the left 136 channel and right 137 channels, respectively. In Equation (33), the generated comfort noise signals $N_L(k)$ and $N_R(k)$ have the correct level and spatial characteristics corresponding to the estimated Inter-channel Level Difference (ILD) parameter and the inter-channel correlation (IC/ICC) parameter. The stereo comfort noise injector 106 finally injects the generated comfort noise signals $N_L(k)$ and $N_R(k)$ in the left 136 (L(k)) and right 137 (R(k)) channels of the decoded stereo sound signal using, for example, the following relation (34):

$$L(k)=L(k)+N_L(k), \text{ for } k=0, \ldots, N/2-1$$

$$R(k)=R(k)+N_R(k), \text{ for } k=0, \ldots, N/2-1 \tag{34}$$

3.2.3 Use of Decoded Spatial Parameters

In the case of a parametric stereo encoder as described in Reference [6], it is possible to code and transmit the IC/ICC and ILD parameters in the bitstream. Then, the transmitted IC/ICC and ILD parameters are used by the stereo comfort noise injector 106 instead of the parameters estimated in Section 3.2.1. Usually, in a parametric stereo encoder, the parameters IC/ICC and ILD are calculated and encoded in frequency domain per critical bands.

The decoded IC/ICC and ILD parameters can be denoted, for example, as follows:

$$ICC_{PS}^{[m]}(b), ILD_{PS}^{[m]}(b), b=0, \ldots, B_{PS}-1 \tag{35}$$

where the subscript PS indicates Parametric Stereo and $B_{PS}$ represents the number of frequency bands b used by the parametric stereo encoder. Also, the maximum frequency of the parametric stereo encoder may be expressed as the last index of the last frequency band, as follows:

$$k_{max\_PS}=\max(k(B_{PS}-1)) \tag{36}$$

Similarly, the mixing factor γ expressed in relation (29) may be calculated per frequency bands with the decoded stereo parameters IC/ICC and ILD using, for example, the following relation (37):

$$\gamma(b)=\sqrt{\frac{ICC_{PS}^{[m]}(b)}{1-ICC_{PS}^{[m]}(b)}+1-\left[ILD_{PS}^{[m]}(b)\right]^2}-\sqrt{\frac{ICC_{PS}^{[m]}(b)}{1-ICC_{PS}^{[m]}(b)}}, \quad b=0, \ldots, B_{PS}-1 \tag{37}$$

where $ICC_{PS}^{[m]}(b)$ is the decoded inter-channel coherence parameter in the bth band, defined in relation (35) and $ILD_{PS}^{[m]}(b)$ is the decoded inter-channel level difference parameter in the bth band, defined in Equation (35).

The stereo comfort noise injector 106 then performs the mixing process using, for example, the following relation (38):

$$N_L(k)=r_{scale}(k)[1+ILD_{PS}^{[m]}(b_k))G_1(k)+\gamma(b_k)G_2(k)], \text{ for } k=0, \ldots, \min(k_{max\_PS}, N/2-1)$$

$$N_R(k)=r_{scale}(k)[1-ILD_{PS}^{[m]}(b_k))G_1(k)-\gamma(b_k)G_2(k)], \text{ for } k=0, \ldots, \min(k_{max\_PS}, N/2-1) \tag{38}$$

where $\gamma(b_k)$ is the mixing factor of the $b_k$-th frequency band containing the kth frequency bin. Thus, a single value of the mixing factor is used when generating comfort noise signal $N_L(k)$ and $N_R(k)$ in frequency bins belonging to a same frequency band, and that for each frequency band. The comfort noise signals $N_L(k)$ and $N_R(k)$ are generated only up to the maximum frequency bin supported by the parametric stereo encoder expressed by $\min(k_{max\_PS}, N/2-1)$.

The stereo comfort noise injector 106 injects the generated comfort noise signals $N_L(k)$ and $N_R(k)$ in the left 136 (L(k)) and right 137 (R(k)) channels of the decoded stereo sound signal again using, for example, the relation (33).

3.2.4 DTX Mode

When the IVAS sound codec operates in DTX mode, the background noise estimation described in Section 3.1 is not performed. Instead, the information about the spectral envelope of the background noise is decoded from a Silence Insertion Descriptor (SID) frame and converted into power spectrum representation. This can be done in various ways depending on the SID/DTX scheme used by the codec. For example, the TD-CNG or FD-CNG technology from the EVS codec (Reference [1]) may be used as they both contain information about background noise envelope.

Also, the IC/ICC and ILD spatial parameters may be transmitted as part of SID frames. In that case the decoded spatial parameters are used in stereo comfort noise generation and injection as described in Section 3.2.3.

3.2.5 Soft VAD Parameter

To prevent abrupt changes in the level of the injected stereo comfort noise, the stereo comfort noise injector 106 applies a fade-in fade-out strategy for noise injection. For that purpose, a soft VAD parameter is used. This is achieved by a smoothing of the binary VAD flag $f_{VAD}$ using, for example, the following relation (39):

$$\tilde{V}_{fact}^{[m]}=\begin{cases}0.7\cdot\tilde{V}_{fact}^{[m-1]}+0.3\cdot f_{VAD}^{[m]}, & \text{if } f_{VAD}^{[m]}>\tilde{V}_{fact}^{[m]}\\ 0.95\cdot\tilde{V}_{fact}^{[m-1]}+0.05\cdot f_{VAD}^{[m]}, & \text{otherwise}\end{cases} \tag{39}$$

where $\tilde{V}_{fact}$ represents the soft VAD parameter, $f_{VAD}$ represents the non-smoothed binary VAD flag, and [m] if the frame index.

From relation (39), it can be seen that the soft VAD parameter is limited in the range from 0 to 1. The soft VAD parameter rises more quickly when the VAD flag $f_{VAD}$ changes from 0 to 1 and less quickly when it drops from 1 to 0. Thus, the fade-out period is longer than the fade-in period.

During the initialization procedure 400 of FIG. 4, when $f_{CNI}=0$, the soft VAD parameter is set to "0". That is $$\tilde{V}_{fact}^{[m]}=0, \text{ if } f_{CNI}=0 \tag{40}$$

The initial value for $\tilde{V}_{fact}$ is 0.

3.2.6 Global Gain Control

The level of the stereo comfort noise is controlled globally with the global gain $g_{scale}$ used in relation (32). The stereo comfort noise injector 106 initializes the global gain $g_{scale}$ to "0" and updates the global gain $g_{scale}$ in each frame using, for example, the following relation (41) as follows:

$$g_{scale}^{[m]}(k)=0.8\cdot\tilde{V}_{fact}^{[m]} \tag{41}$$

where $\tilde{V}_{fact}$ is the soft VAD parameter calculated in Equation (39). During the initialization period, when $f_{CNI}=0$, the global gain $g_{scale}$ is reset to "0". Thus, the global gain $g_{scale}$ closely follows the soft VAD parameter $\tilde{V}_{fact}^{[m]}$, thereby applying a fade-in fade-out effect to the injected stereo comfort noise.

4. Example Configuration of Hardware Components

Figure 5:
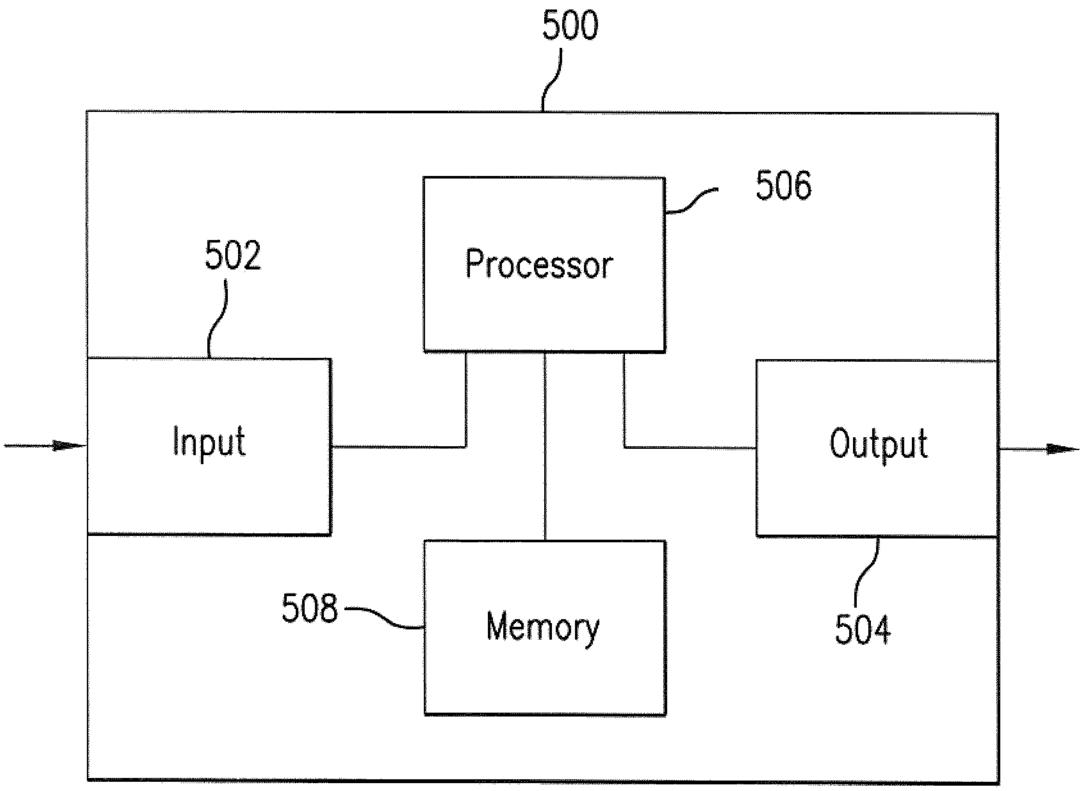
FIG. 5 is a simplified block diagram of an example configuration of hardware components forming the above described parametric stereo decoder and decoding method, including the device and method for multi-channel comfort noise injection.

FIG. 5 is a simplified block diagram of an example configuration of hardware components forming the above described parametric stereo decoder including the device for stereo comfort noise injection.

The parametric stereo decoder including the device for stereo comfort noise injection may be implemented as a part of a mobile terminal, as a part of a portable media player, or in any similar device. The parametric stereo decoder including the device for stereo comfort noise injection (identified as 500 in FIG. 5) comprises an input 502, an output 504, a processor 506 and a memory 508.

The input 502 is configured to receive the bitstream (FIG. 1) from the parametric stereo encoder (not shown). The output 504 is configured to supply the left channel 140 and the right channel 141 (FIG. 1). The input 502 and the output 504 may be implemented in a common module, for example a serial input/output device.

The processor 506 is operatively connected to the input 502, to the output 504, and to the memory 508. The processor 506 is realized as one or more processors for executing code instructions in support of the functions of the various elements and operations of the above described parametric stereo decoder and decoding method, including the device and method for stereo comfort noise injection as shown in the accompanying figures and/or as described in the present disclosure.

The memory 508 may comprise a non-transient memory for storing code instructions executable by the processor 506, specifically, a processor-readable memory storing non-transitory instructions that, when executed, cause a processor to implement the elements and operations of the parametric stereo decoder and decoding method, including the device and method for stereo comfort noise injection. The memory 508 may also comprise a random access memory or buffer(s) to store intermediate processing data from the various functions performed by the processor 506.

Those of ordinary skill in the art will realize that the description of the parametric stereo decoder and decoding method, including the device and method for stereo comfort noise injection are illustrative only and are not intended to be in any way limiting. Other embodiments will readily suggest themselves to such persons with ordinary skill in the art having the benefit of the present disclosure. Furthermore, the disclosed parametric stereo decoder and decoding method, including the device and method for stereo comfort noise injection may be customized to offer valuable solutions to existing needs and problems of encoding and decoding sound, for example stereo sound.

In the interest of clarity, not all of the routine features of the implementations of the parametric stereo decoder and decoding method, including the device and method for stereo comfort noise injection are shown and described. It will, of course, be appreciated that in the development of any such actual implementation of the parametric stereo decoder and decoding method, including the device and method for stereo comfort noise injection, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the elements, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

Elements and processing operations of the parametric stereo decoder and decoding method, including the device and method for stereo comfort noise injection as described herein may comprise software, firmware, hardware, or any combination(s) of software, firmware, or hardware suitable for the purposes described herein.

In the parametric stereo decoder and decoding method, including the device and method for stereo comfort noise injection, the various processing operations and sub-operations may be performed in various orders and some of the processing operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

5. References

The present disclosure mentions the following references, of which the full content is incorporated herein by reference:

[1] 3GPP TS 26.445, v.16.1.0, "Codec for Enhanced Voice Services (EVS); Detailed Algorithmic Description", July 2020.

[2] E. Schuijers, W. Oomen, B. den Brinker, and J. Breebaart, "*Advances in parametric coding for high-quality audio*," in Proc. 114th AES Convention, Amsterdam, The Netherlands, March 2003, Preprint 5852.

[3] F. Baumgarte, C. Faller, "Binaural cue coding—Part I: Psychoacoustic fundamentals and design principles," IEEE Trans. Speech Audio Processing, vol. 11, pp. 509-519, November 2003.

[4] 3GPP SA4 contribution S4-170749, "New WID on EVS Codec Extension for Immersive Voice and Audio Services", SA4 meeting #94, Jun. 26-30, 2017, http://www.3gpp.org/ftp/tsg_sa/WG4_CODEC/TSGS4_94/Docs/S4-170749.zip

[5] R. Hagen and E. Ekudden, "*An* 8 *kbit/s ACELP coder with improved background noise performance,*" 1999 IEEE International Conference on Acoustics, Speech, and Signal Processing. Proceedings. ICASSP99 (Cat. No. 99CH36258), Phoenix, AZ, USA, 1999, pp. 25-28 vol. 1, doi: 10.1109/ICASSP.1999.758053.

[6] J. Breebaart, S. van de Par, A. Kohlrausch, "*Parametric Coding of Stereo Audio.*" EURASIP Journal of Advanced Signal Processing 2005, 561917 (2005). https://doi.org/10.1155/ASP.2005.1305

What is claimed is:

1. A device implemented in a multi-channel sound decoder for injecting multi-channel comfort noise in a decoded multi-channel sound signal, comprising:

at least one processor; and a memory coupled to the processor and storing non-transitory instructions that when executed cause the processor to implement:

a background noise estimator for estimating background noise in a decoded mono down-mixed signal and for generating an estimation of the background noise in the decoded mono down-mixed signal;

an up-mixer using the decoded mono down-mixed signal for producing a plurality of channels of the decoded multi-channel sound signal; and of a multi-channel comfort noise injector (a) for calculating, in response to the estimation of the background noise in the decoded mono down-mixed signal, a distinct comfort noise signal for each of the plurality of channels of the decoded multi-channel sound signal and (b) for separately injecting in each of the plurality of channels the distinct comfort noise signal calculated by the multi-channel comfort noise injector for the said channel of the decoded multi-channel sound signal.

2. The device according to claim 1, wherein the background noise estimator estimates a background noise envelope by analyzing the decoded mono down-mixed signal during speech inactivity.

3. The device according to claim 1, wherein the background noise estimator calculates a power spectrum of the decoded mono down-mixed signal and compresses the power spectrum of the decoded mono down-mixed signal.

4. The device according to claim 3, wherein the background noise estimator normalizes the power spectrum of the decoded mono down-mixed signal and compresses the normalized power spectrum.

5. The device according to claim 3, wherein the background noise estimator compresses the power spectrum of the decoded mono down-mixed signal by compacting frequency bins of the power spectrum into frequency bands for frequencies higher than a given frequency.

6. The device according to claim 5, wherein, for frequencies higher than the said given frequency, the background noise estimator compacts frequency bins of the power spectrum into frequency bands by means of spectral averaging of a range of frequency bins of the power spectrum in each frequency band, and wherein, to spectrally average the range of frequency bins of the power spectrum in each frequency band, the background noise estimator calculates a variance of the range of frequency bins of the power spectrum in each frequency band.

7. The device according to claim 3, wherein the background noise estimator adds random gaussian noise to the compressed power spectrum to compensate for a loss of variance of the estimation of the background noise in the decoded mono down-mixed signal.

8. The device according to claim 7, wherein the background noise estimator calculates a variance of the random gaussian noise in each one of frequency bands using the power spectrum of the decoded mono down-mixed signal, and generates random gaussian noise having zero mean and the calculated random gaussian noise variance.

9. The device according to claim 3, wherein the background noise estimator smooths the compressed power spectrum by means of an infinite impulse response IIR filter.

10. The device according to claim 9, wherein the IIR filter is responsive to a voice activity detection (VAD) flag in a current frame so that smoothing of the compressed power spectrum is stronger during inactive segments of the decoded multi-channel sound signal and weaker during active segments of the said decoded multi-channel sound signal.

11. The device according to claim 9, wherein the background noise estimator comprises a successive IIR filter to update the smoothed compressed power spectrum in a number of consecutive inactive frames.

12. The device according to claim 9, wherein the background noise estimator, for a given value of a voice activity detection (VAD) flag and given values of a ratio between a total energy of the compressed power spectrum and a total energy of the smoothed compressed power spectrum, updates the smoothed compressed power spectrum in a current frame in frequency bands above a given frequency.

13. The device according to claim 9, wherein the background noise estimator expands the smoothed compressed power spectrum.

14. The device according to claim 13, wherein the background noise estimator, up to a given frequency, performs no expansion of the smoothed compressed power spectrum.

15. The device according to claim 13, wherein the background noise estimator, for frequencies higher than a determined frequency, expands the smoothed compressed power spectrum by means of linear interpolation using a multiplicative increment.

16. The device according to claim 13, wherein the multi-channel comfort noise injector controls a spectral envelope of a stereo comfort noise using the expanded power spectrum.

17. The device according to claim 16, wherein the multi-channel comfort noise injector performs a reduction of frequency resolution by setting a level of comfort noise to a minimum level in two adjacent frequency bins of the expanded power spectrum if a ratio between a maximum level and the minimum level of comfort noise in the two adjacent frequency bins of the expanded power spectrum exceeds a given threshold.

18. The device according to claim 16, wherein the multi-channel comfort noise injector performs a reduction of frequency resolution by setting a level of comfort noise to a mean of minimum and maximum levels of comfort noise in two adjacent frequency bins of the expanded power spectrum if a ratio between the minimum and maximum levels does not exceed a certain threshold.

19. The device according to claim 16, wherein the multi-channel comfort noise injector scales a level of comfort noise for injection in respective channels of the decoded multi-channel sound signal using a scaling factor.

20. The device according to claim 19, wherein the multi-channel comfort noise injector of comfort neise calculates the scaling factor using a number of frequency bins divided by two and a global gain.

21. The device according to claim 20, wherein the multi-channel comfort noise injector of comfort noise calculates the global gain by (a) smoothing a binary voice activity detection (VAD) flag to produce a soft VAD parameter limited in the range between 0 and 1, and (b) producing the global gain as a function of the soft VAD parameter.

22. The device according to claim 16, wherein the multi-channel comfort noise injector generates the comfort noise for each channel of the decoded multi-channel sound signal as a function of a scaling factor, spatial parameters in a current frame of the decoded multi-channel sound signal, and random signals.

23. The device according to claim 1, wherein the background noise estimator calculates a frequency transform of the decoded mono down-mixed signal and calculates a power spectrum of the decoded mono down-mixed signal using the frequency transform of the decoded mono down-mixed signal.

24. The device according to claim 23, wherein, to calculate the frequency transform of the decoded mono down-mixed signal, the background noise estimator windows the decoded mono down-mixed signal and applies the frequency transform to the windowed decoded mono down-mixed signal.

25. The device according to claim 1, wherein the background noise estimator performs no compression of a power spectrum of the decoded mono down-mixed signal but calculates the power spectrum of the decoded mono down-mixed signal and converts frequency bins of the power spectrum into respective frequency bands for frequencies below a given frequency.

26. A device implemented in a multi-channel sound decoder for injecting multi-channel comfort noise in a decoded multi-channel sound signal, comprising:

at least one processor; and a memory coupled to the processor and storing non-transitory instructions that when executed cause the processor to:

estimate background noise in a decoded mono down-mixed signal and generate an estimation of the background noise in the decoded mono down-mixed signal;

produce a plurality of channels of the decoded multi-channel sound signal using the decoded mono down-mixed signal; and calculate, in response to the estimation of the background noise in the decoded mono down-mixed signal, a distinct comfort noise signal for each of the plurality of channels of the decoded multi-channel sound signal and separately inject in each of the plurality of channels the distinct comfort noise signal calculated for the said channel of the decoded multi-channel sound signal.

27. A method implemented in a multi-channel sound decoder for injecting multi-channel comfort noise in a decoded multi-channel sound signal, comprising:

estimating background noise in a decoded mono down-mixed signal and generating an estimation of the background noise in the decoded mono down-mixed signal;

producing a plurality of channels of the decoded multi-channel sound signal using the decoded mono down-mixed signal;

calculating, in response to the estimation of the background noise in the decoded mono down-mixed signal, a distinct comfort noise signal for each of the plurality of channels of the decoded multi-channel sound signal; and separately injecting in each of the plurality of channels the distinct comfort noise signal calculated for the said channel of the decoded multi-channel sound signal.

28. The method according to claim 27, wherein estimating background noise comprises estimating a background noise envelope by analyzing the decoded mono down-mixed signal during speech inactivity.

29. The method according to claim 27, wherein estimating background noise comprises calculating a power spectrum of the decoded mono down-mixed signal and compressing the power spectrum of the decoded mono down-mixed signal.

30. The method according to claim 29, wherein estimating background noise comprises normalizing the power spectrum of the decoded mono down-mixed signal and compressing the normalized power spectrum.

31. The method according to claim 29, wherein estimating background noise comprises, to compress the power spectrum of the decoded mono down-mixed signal, compacting frequency bins of the power spectrum into frequency bands for frequencies higher than a given frequency.

32. The method according to claim 31, wherein estimating background noise comprises, for frequencies higher than the said given frequency, compacting frequency bins of the power spectrum into frequency bands by means of spectral averaging of frequency bins of the power spectrum in each frequency band and, to spectrally average frequency bins of the power spectrum in each frequency band, calculating a variance of the frequency bins of the power spectrum in each frequency band.

33. The method according to claim 29, wherein estimating background noise comprises adding random gaussian noise to the compressed power spectrum to compensate for a loss of variance of the estimation of the background noise in the decoded mono down-mixed signal.

34. The method according to claim 33, wherein estimating background noise comprises calculating a variance of the random gaussian noise in each one of frequency bands using the power spectrum of the decoded mono down-mixed signal and generating random gaussian noise having zero mean and the calculated random gaussian noise variance.

35. The method according to claim 29, wherein estimating background noise comprises smoothing the compressed power spectrum by means of infinite impulse response IIR filtering.

36. The method according to claim 35, wherein the IIR filtering is responsive to a voice activity detection (VAD) flag in a current frame so that smoothing of the compressed power spectrum is stronger during inactive segments of the decoded multi-channel sound signal and weaker during active segments of the said decoded multi-channel sound signal.

37. The method according to claim 35, wherein estimating background noise comprises using a successive IIR filter to update the smoothed compressed power spectrum in a number of consecutive inactive frames.

38. The method according to claim 35, wherein estimating background noise comprises expanding the smoothed compressed power spectrum.

39. The method according to claim 38, wherein estimating background noise comprises performing, up to a given frequency, no expansion of the smoothed compressed power spectrum.

40. The method according to claim 38, wherein estimating background noise comprises, for frequencies higher than a determined frequency, expanding the smoothed compressed power spectrum by means of linear interpolation using a multiplicative implement.

41. The method according to claim 38, wherein calculating and separately injecting distinct comfort noise signals comprises controlling a spectral envelope of a stereo comfort noise using the expanded power spectrum.

42. The method according to claim 41, wherein calculating and separately injecting distinct comfort noise signals comprises performing a reduction of frequency resolution by setting a level of comfort noise to a minimum level in two adjacent frequency bins of the expanded power spectrum if a ratio between a maximum level and the minimum level of comfort noise in the two adjacent frequency bins of the expanded power spectrum exceeds a given threshold.

43. The method according to claim 41, wherein calculating and separately injecting distinct comfort noise signals comprises performing a reduction of frequency resolution by setting a level of comfort noise to a mean of minimum and maximum levels of comfort noise in two adjacent frequency bins of the expanded power spectrum if a ratio between the minimum and maximum levels does not exceed a certain threshold.

44. The method according to claim 41, wherein calculating and separately injecting distinct comfort noise signals comprises scaling a level of comfort noise for injection in respective channels of the decoded multi-channel sound signal using a scaling factor.

45. The method according to claim 44, wherein calculating and separately injecting distinct comfort noise signals comprises calculating the scaling factor using a number of frequency bins divided by two and a global gain.

46. The method according to claim 45, wherein calculating and separately injecting distinct comfort noise signals comprises calculating the global gain by (a) smoothing a binary voice activity detection (VAD) flag to produce a soft VAD parameter limited in the range between 0 and 1, and (b) producing the global gain as a function of the soft VAD parameter.

47. The method according to claim 27, wherein estimating background noise comprises calculating a frequency transform of the decoded mono down- mixed signal and calculating a power spectrum of the decoded mono down-mixed signal using the frequency transform of the decoded mono down-mixed signal.

48. The method according to claim 47, wherein estimating background noise comprises, to calculate the frequency transform of the decoded mono down-mixed signal, windowing the decoded mono down-mixed signal and applying the frequency transform to the windowed decoded mono down-mixed signal.

49. The method according to claim 27, wherein estimating background noise comprises performing no compression of a power spectrum of the decoded mono down-mixed signal but calculating the power spectrum of the decoded mono down-mixed signal and converting frequency bins of the power spectrum into respective frequency bands for frequencies below a given frequency.

* * * * *